United States Patent [19]

Greathead

[11] Patent Number: 4,595,624

[45] Date of Patent: Jun. 17, 1986

[54] SECURITY GLAZING

[75] Inventor: Thomas W. Greathead, Billericay, England

[73] Assignee: Post Office, Postal Headquarters, London, England

[21] Appl. No.: 638,111

[22] Filed: Aug. 6, 1984

[30] Foreign Application Priority Data

Aug. 10, 1983 [GB] United Kingdom ............... 8321555

[51] Int. Cl.$^4$ .............................................. B32B 17/10
[52] U.S. Cl. ...................................... 428/213; 428/214; 428/426; 428/437; 428/911
[58] Field of Search ................. 428/437, 213, 214, 911

[56] References Cited

U.S. PATENT DOCUMENTS

| 3,624,238 | 5/1928 | McKenzie | 161/183 |
| 3,864,204 | 2/1975 | Shorr et al. | 428/437 |
| 3,904,460 | 9/1975 | Comperatore | 428/437 |
| 4,130,684 | 12/1978 | Littell, Jr. et al. | 428/437 |

FOREIGN PATENT DOCUMENTS

| 0003432 | 1/1979 | European Pat. Off. |
| 1156971 | 11/1963 | Fed. Rep. of Germany |
| 732405 | 6/1932 | France |

*Primary Examiner*—Paul J. Thibodeau
*Attorney, Agent, or Firm*—Merchant, Gould, Smith, Edell, Welter & Schmidt

[57] ABSTRACT

A security glass which possesses substantial resistance to penetration by impact by a heavy implement and which exhibits only a small amount of spall formation is a glass flexible bonding material, e.g. polyvinylbutyral, laminate in which the layer of flexible bonding material positioned other than at the forwardmost flexible bonding material layer position possesses increased thickness. The rearmost glass layer is generally relatively thin and is preferably chemically toughened.

6 Claims, 3 Drawing Figures

SECURITY GLAZING

This invention relates to security glazing and in particular to laminated anti-bandit glazing.

Laminated anti-bandit and bullet resistant glazing has been used for many years in security screen installations in for example post offices, banks, building societies, shop and display windows, warehouses, offices, museums, showcases and art gallerys. The common feature of such glazing is the laminated glass construction by which is meant a construction formed of sheets of float glass bonded by intermediate layers of flexible bonding materials of which polyvinylbutyral (pvb) is the most commonly used. The number of laminations and thickness thereof will vary according to the degree of protection required, the minimum being two sheets of glass separated by one layer of pvb as for example in a 7.5 mm–3 ply lamination made up of 3 mm glass/1.5 mm pvb/3 mm glass which provides minimum anti-bandit resistance. Laminated glass of smaller thickness is considered to be safety rather than security glass.

In general, the greater the total thickness of the laminate, the greater the protection achieved, although care must be taken in the selection of the thicknesses of the respective components in the lamination. It is primarily to glass specified as "anti-bandit" that this invention is directed. By "anti-bandit" is meant in particular resistance of the glass to sustained manual attacks from hammers, pick-axes, crowbars, bricks and other heavy implements likely to be employed by criminals. Such glass is subject in the United Kingdom to British Standard 5544. However, while increasing glass laminate thicknesses will in principle increase attach resistance, this is inefficient and not cost effective.

For many purposes, it is indeed desirable that anti-bandit glass meets a higher standard which allows it to be termed "bullet-resistant" glass. For this purpose it will need to be able to withstand ballistic attack, the grade of glass chosen being matched to specific weapons likely to be employed. British Standard 5051 covers bullet resistant glass laminates ranging in thickness from 25 mm to 78 mm.

Glass is amorphous, i.e. from a strictly scientific point of view it can be considered to be a liquid at normal temperatures, albeit in a very viscous form. It is therefore not surprising perhaps to find that as an engineering material it has very peculiar properties. It is very brittle and has a high compressive strength. Moreover studies of its tensile strength when it is in a thin filament form such as in glass fibres-reinforced plastics sheets or mouldings suggest that even when in the filament form, the full tensile strength potential of a glass is not realised. Investigations show that glass behaves as though there were fine cracks in its surface even when the surface is known to be highly polished and completely free of such cracks. This oddity has never satisfactorily been explained although it usually does not give rise to difficulties when glass is used for conventional glazing, but the picture is different with security glazing. Thus, a major problem with security glazing whether manufactured as anti-bandit or anti-ballistic glazing, is that while it is possible to design a screen which withstands the force of repeated impact with heavy implements, all determined attacks produce spall off the rear face of the screen glazing. The spall which consists of glass slivers and fragments can travel at high velocity through the air for some considerable distance during an attack. Hence spall is very dangerous and can seriously lacerate the face of a counter clerk or bank teller standing about 1 meter behind the glass. Indeed even minute slivers of glass can seriously harm the eyesight.

A number of approaches to the problem of spall have hitherto been attempted. There are already known to be commercially available so-called spall resistant security glasses comprising a very thin float glass panel having a thickness of 1.0/1.5 mm bonded on by an additional pvb layer on the rear face of the security glass and which it is claimed will inhibit to a considerable extent the production of spall from the initial blows in an attack. Moreover tests have been carried out using a variety of combinations of float glass and pvb, including double glazed layouts. None of these attempts at providing an anti-spall glass have eliminated completely the problem of spall.

It is an object of this invention to provide a laminated anti-bandit security glazing having high resistance to impacts in relation to the glass laminate thickness.

According to the present invention, there is provided a security glass which is a laminate of a plurality of layers of glass and a plurality of layers of flexible bonding material alternating with each other with glass layers lying outermost, in which laminate layers of flexible bonding material are of different thickness, with a said layer of flexible bonding material which possesses the greater or greatest thickness of any of the layers of flexible bonding material being other than the layer of flexible bonding material which is forwardmost in relation to the direction of expected impact.

This invention is based on a series of observations resulting from extensive testing to be reported hereinafter. These conclusions may be summarised as follows:

1. The thicker a layer of flexible bonding material of which polyvinylbutyral is the preferred material, the greater the resistance of glazing to penetration on attack.

2. The further such a layer is placed towards the rear face, that is away from the attack face, the greater its effect on the resistance of glazing.

From engineering structural considerations, this invention utilizes the high compressive strength of glass in a position in the laminate where the compressive forces are most intense during an attack; the flexible bonding material is located where tensile forces occur. It has been observed that to be most effective, the major part of the flexible bonding material should be placed as a layer towards the rear of the laminate. Indeed, by means of a symmetrical arrangement of alternating glass and flexible bonding material layers, it is possible to produce a laminate of say 5 or 7 glass layers with the central layer of flexible bonding material being thicker than outer layers of flexible material. Hence a lamination with high resistance to attack in both directions or having superior resistance to ballistic attack results.

According to a preferred feature of the invention, the laminate possesses a rearmost glass layer which is chemically toughened and indeed in general the rearmost glass layer is preferably thin in relation to the other glass layers. Not only has it been observed that when a rearmost glass layer of an inventive laminate is thin, spall formation is reduced and that the formation of this thin glass layer from chemically toughened glass produces minimum spall without sliver formation and has the advantage of considerably increasing the overall strength of the glazing, but more particularly, thin usually chemically toughened glass acts as a tensile element producing superior attack resistance. Such a thin final layer of chemically toughened glass which may be employed in the practice of the present invention is flexible because of its thinness and this enables it to function as a tensile structural element. This results particularly in a glass combination possessing a considerable increase in strength and attack resistance. Such toughened glass is glass which has been processed in such a manner that the outer skin or surface is in compression. This ensures that even when the glass is under high tensile loads, the surface is not. Hence the aforementioned surface crack effect is avoided and the full tensile strength of the glass may be realised.

Because, however, thin glass, even when chemically toughened which is supported by a thick layer of flexible bonding material is relatively easily cracked by pressure from any sharp item on the outer glass surface, it is preferred when employing a thin glass rearmost layer to interpose between it and the thickest layer of flexible bonding material, a layer of thicker float glass having a thickness of for example 2 mm.

For a better understanding of the invention and to show how the same be carried into effect, reference will now be made by way of example only to the accompanying drawings, wherein.

Figure 1:
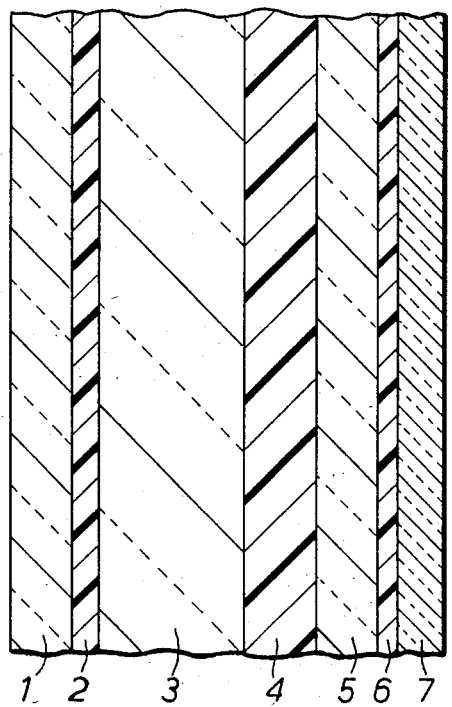
FIG. 1 is a section through an optimal glass laminate employing this invention.

Referring to the drawings, the glass laminate of FIG. 1 comprises four sheets of glass bearing the reference numerals 1, 3, 5 and 7 with layers 1, 3 and 5 being formed of float glass and having respectively thicknesses of 2 mm, 5 mm and 2 mm. At the rearmost face of the glass in the sense of the likely direction of impact is the layer 7 which is 1.5 mm thick chemically toughened glass sheet. Between the adjacent pairs of glass sheets are polyvinylbutyral layers. The pvb layer between glass sheets 1 and 3 possesses a thickness of 0.76 mm, that between glass sheets 5 and 7 possesses a thickness of 0.38 mm. However the central pvb layer possesses a considerably greater thickness of 2.28 mm. It has been found that this combination of chemically toughened relatively thin rearmost glass sheet and thick pvb layer at a position remote from the front of the glazing serves to produce a glass laminate of superior impact resistance and freedom from spall formation when subject to impact with a heavy instrument.

Figure 2:
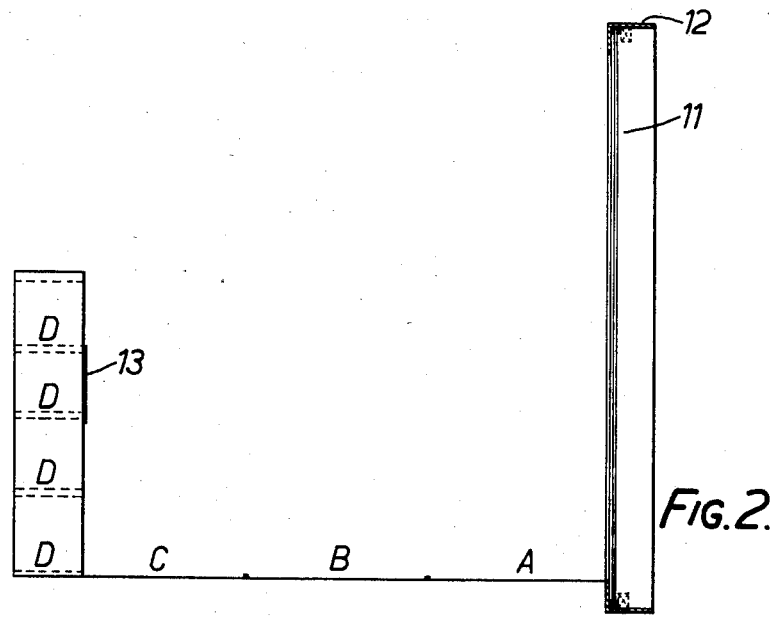
FIG. 2 is a vertical section through a test arrangement for testing for spall formation a laminated glass panel.
Figure 3:
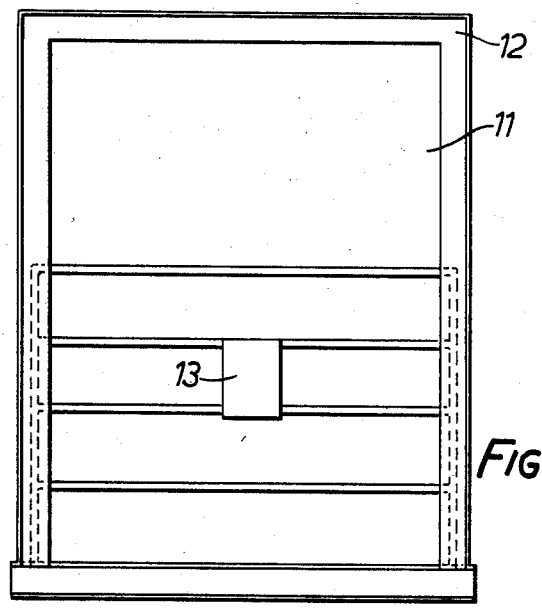
FIG. 3 is an elevational view of the test arrangement.

Referring to FIGS. 2 and 3, the test arrangement shown there is designed to simulate conditions which would be encountered at a bank or post office counter in the event of an attempt by bandits to break through security glazing either in terrorising staff or to enable them to have physical access to the staff side of the counter. Thus a glass test panel 11 is held in a test rig 12 so as to remain upright even when subject to impacts. Spall collection trays A, B and C lie in turn behind the test panel 11, each having a width of 390 mm with the combined width of 1150 mm simulating the depth of a bank counter. Spall collection trays D are stacked at a position likely to be occupied by a counter clerk and serve to collect spall which has flown through the air rather than merely fallen towards one of the collection trays. One of the trays D is covered by a witness paper 13 which is intended to simulate the face of a counter clerk during an attack on the test panel 10. The clamped test panel has a width of about 1 meter.

The following non-limiting Example illustrates this invention:

EXAMPLE

A series of experiments was carried out utilising a variety of test panels made up with different combinations of glass sheets and polyvinylbutyral layers. Three main categories of glass laminate were tested:

A. Float glass layers with pvb inter-layers;
B. Float glass layers with pvb inter-layers and a rear face of 1.5 mm chemically toughened glass; and
C. Float glass layers with pvb inter-layers and a rear face panel of 4 or 5 mm heat treated toughened glass.

The characteristics of the various test panels made up and tested in the manner to be set out hereinafter are set out in Table 1 which follows. The numerical values given in the description of the glass indicate the thickness of successive layers commencing from the float glass sheet at the front of the glass laminate. The abbreviations have the following significance: c=chemically toughened; h=heat treated toughened; and n=not toughened. Furthermore, the laminates were made up by the following Companies: Tyneside, indicated by T, Alcan indicated by A and Doulton, indicated by D. It will be appreciated that in some of the tests, glazing panels identical in specification and/or manufacturing source to those used in other tests were employed. This apparent repetition was for the purpose of either accounting for any variations in materials or manufacturing method employed by the different manufacturers and/or to provide like panels for subjecting to different test conditions.

The various panels were subjected to rigorous impact testing. The panels were impacted with a 3.15 kg (7 lb) sledge hammer of the type currently employed by criminals, the impacting sequences being divided up into 1, 19 and 40 second sequences to enable damage and fall out of spall from the glass panels to be monitored after each test period. These test conditions were more rigorous than those imposed normally on security glazing in British Crown Post Offices which merely require that the glass should not spring out of its frame after an attack lasting 20 seconds with a 1.12 kg (2.51 lb) hand hammer.

Tables 2 and 3 show the test results obtained. Table 2 indicates whether there was any spall formation on the first impact and then indicates the number of blows applied during the subsequent 20 second and 40 second impact periods, followed by an indication of the number of blows and the overall impact time involved before penetration occurred.

Table 3 shows in grams the number of grams of spall collected in trays A, B, C and D (combined) in the test arrangement shown in FIGS. 2 and 3 of the accompanying drawings.

TABLE 1

| Test No. | Glass Source | Glass configuration | Toughening |
|---|---|---|---|
| 1 | A | 3 + 1.14 + 3 + 1.14 + 3 | n |
| 2 | A | 3 + 1.14 + 3 + 1.14 + 3 | n |
| 3 | T | 3 + 1.14 + 3 + 1.14 + 3 | n |
| 4 | D | 2 + 1.14 + 5 + 1.14 + 2 + 0.38 + 1.5 | c |
| 5 | T | 2 + 1.14 + 5 + 1.14 + 2 + 0.76 + 1.1 | n |
| 6 | T | 2 + 1.14 + 5 + 1.14 + 2 + 0.76 + 1.5 | c |
| 7 | D | 2 + 0.76 + 5 + 1.52 + 4 | h |
| 8 | T | 2 + 0.76 + 5 + 1.52 + 2 | n |

TABLE 1-continued

| Test No. | Glass Source | Glass configuration | Toughening |
|---|---|---|---|
| 9 | T | 5 + 2.28 + 5 + 0.38 + 1.1 | n |
| 10 | T | 5 + 2.28 + 5 + 0.76 + 1.1 | n |
| 11 | T | 2 + 0.76 + 5 + 2.28 + 2 + 0.76 + 1.5 | c |
| 12 | D | 2 + 0.76 + 5 + 2.28 + 4 | h |
| 13 | D | 2 + 0.76 + 5 + 2.28 + 2 + 0.38 + 1.5 | c |
| 14 | T | 3 + 1.14 + 3 + 1.14 + 3 + 0.38 + 1.1 | n |
| 15 | A | 3 + 1.14 + 3 + 1.14 + 3 | n |
| 16 | A | 3 + 1.14 + 3 + 1.14 + 3 | n |
| 17 | T | 2 + 0.76 + 5 + 1.52 + 2 + 0.38 + 1.1 | n |
| 18 | D | 5 + 2.28 + 5 | h |
| 19 | T | 5 + 2.28 + 5 + 0.76 + 1.5 | c |
| 20 | T | 2 + 0.76 + 5 + 2.28 + 2 + 0.38 + 1.1 | n |
| 21 | D | 5 + 2.28 + 5 + 0.38 + 1.5 | c |
| 22 | D | 3 + 1.14 + 3 + 1.14 + 3 + 0.38 + 1.5 | c |
| 23 | T | 2 + 0.76 + 5 + 2.28 + 2 | n |
| 24 | T | 3 + 1.14 + 3 + 1.14 + 3 + 0.76 + 1.5 | c |
| 25 | T | 3 + 1.14 + 3 + 1.14 + 3 + 0.76 + 1.1 | n |
| 26 | T | 2 + 1.14 + 5 + 1.14 + 2 | n |
| 27 | D | 2 + 1.14 + 5 + 1.14 + 4 | h |
| 28 | T | 2 + 0.76 + 5 + 1.52 + 2 + 0.76 + 1.1 | n |
| 29 | T | 2 + 0.76 + 5 + 2.28 + 2 + 0.76 + 1.1 | n |
| 30 | D | 3 + 1.14 + 3 + 1.14 + 4 | h |
| 31 | T | 2 + 1.14 + 5 + 1.14 + 2 + 0.38 + 1.1 | n |
| 32 | T | 2 + 0.76 + 5 + 1.52 + 2 + 0.76 + 1.5 | c |
| 33 | D | 2 + 0.76 + 5 + 1.52 + 2 + 0.38 + 1.5 | c |
| 34 | T | 5 + 2.28 + 5 | n |

TABLE 2

| Test No. | 1st Blow Spall | No. of Blows 2-19 secs. | No. of Blows 20-60 secs. | To Penetration No. of Blows | Times |
|---|---|---|---|---|---|
| 1 | Yes | 13 | 26 | (13)14 | (17)18* |
| 2 | Yes | 17 | 33 | 21 | 22 |
| 3 | Yes | 11 | 26 | 12 | 16 |
| 4 | No | 15 | 25 | 23 | 30 |
| 5 | Yes | 12 | 28 | (18)19 | (27)28* |
| 6 | Yes | 14 | 25 | 21 | 27 |
| 7 | Yes | 14 | 30 | 10 | 12 |
| 8 | Yes | 14 | 27 | 9 | 12 |
| 9 | No | 14 | 28 | 8 | 10 |
| 10 | Yes | 14 | 26 | 24 | 33 |
| 11 | No | 12 | 28 | 41 | 60 |
| 12 | Yes | 14 | 23 | (25)28 | (26)40* |
| 13 | No | 15 | 29 | No Penetration | |
| 14 | Yes | 14 | 26 | (14)15 | (20)21* |
| 15 | Yes | 14 | 21** | 5 | 5 |
| 16 | Yes | 14 | 22** | 4 | 4 |
| 17 | Yes | 18 | 29 | (16)(12)17 | (6)(17)18* |
| 18 | Yes | 14 | 30 | 5 | 6 |
| 19 | Yes | 14 | 30 | 8 | 10 |
| 20 | Yes | 14 | 27 | 6 | 6 |
| 21 | Yes | 14 | 23 | 16 | 21 |
| 22 | Yes | 9 | 22 | (4)5 | (5)6* |
| 23 | Yes | 13 | 29 | 12 | 16 |
| 24 | Yes | 14 | 29 | 8 | 9 |
| 25 | Yes | 13 | 28 | 8 | 10 |
| 26 | Yes | 16 | 30 | (12)14 | (13)17* |
| 27 | Yes | 17 | 29 | 8 | 9 |
| 28 | Yes | 19 | 31 | 6 | 6 |
| 29 | Yes | 15 | 17 | (19)21 | (24)27* |
| 30 | Yes | 13 | 27 | (9)12 | (12)19* |
| 31 | Yes | 14 | 26 | 19 | 25 |
| 32 | No | 13 | 27 | (26)28 | (37)40* |
| 33 | Yes | 13 | 23 | 7 | 9 |
| 34 | Yes | 13 | 27 | 12 | 17 |

*Possible penetration in brackets.
**Tests stopped at number of blows indicated

TABLE 3

| Test No. | Spall Weights A | B | C | D |
|---|---|---|---|---|
| 1 | 258 | 80 | 150 | 62 |
| 2 | 252 | 260 | 178 | 137 |
| 3 | 112 | 134 | 118 | 71 |
| 4 | 30 | 30 | 29 | 23 |
| 5 | 96 | 100 | 58 | 39 |
| 6 | 54 | 39 | 28 | 19 |
| 7 | 393 | 233 | 179 | 145 |
| 8 | 175 | 149 | 73 | 60 |
| 9 | 134 | 82 | 59 | 41 |
| 10 | 25 | 27 | 27 | 13 |
| 11 | 13 | 19 | 21 | 19 |
| 12 | 54 | 67 | 68 | 65 |
| 13 | No Measurable Spall | | | |
| 14 | 47 | 28 | 33 | 39 |
| 15 | No Measure of Spall taken for this test | | | |
| 16 | 204 | 220 | 187 | 130 |
| 17 | 180 | 93 | 80 | 50 |
| 18 | 222 | 208 | 247 | 214 |
| 19 | 223 | 123 | 139 | 78 |
| 20 | 170 | 80 | 71 | 86 |
| 21 | 97 | | 162 | 57 |
| 22 | 90 | 72 | 61 | 40 |
| 23 | 78 | 73 | 70 | 45 |
| 24 | 121 | 87 | 82 | 59 |
| 25 | 97 | 68 | 40 | 26 |
| 26 | 182 | 172 | 124 | 69 |
| 27 | 325 | 240 | 289 | 174 |
| 28 | 179 | 116 | 86 | 59 |
| 29 | 49 | 43 | 39 | 24 |
| 30 | 260 | 295 | 309 | 175 |
| 31 | 181 | 113 | 81 | 69 |
| 32 | 53 | 65 | 76 | 53 |
| 33 | 103 | 120 | 108 | 62 |
| 34 | 103 | 158 | 205 | 142 |

It is desirable that the number of blows required to penetrate the glass panel be as large as possible and ideally take as long as possible to give counter staff the maximum opportunity to raise an alarm and obtain assistance. On this basis, the panels employed in tests Nos. 11 and 13 possessed excellent behaviour followed, as a group, by the panels of tests 2, 4, 6, 10, 12, 29 and 32.

Where spall formation is concerned, it is necessary to look at both the total quantity of spall formed and also the amount of spall which reached collection trays D. Overall spall formation is an indication of the weakness of the security glass and the smaller the quantity of spall reaching trays D indicates the safety against flying spall which will be afforded to staff by the glass. On this basis, minimum spall formation was achieved with the panels of tests 10, 11 and, in particular, 13. From the point of view of flying spall, the panel of test 13 was best followed by the panels of tests 10, 11, 4, 29 and 25.

Comparison of these test results with the constructions of the glass panels involved confirms that the best results were obtained when the glass panels possessed a thin sheet of chemically toughened glass as the rearmost glass layer and a relatively thick layer of polyvinylbutyral at a location remote from the front of the glass panel. Moreover, it can be seen that a construction with more than three glass layers is to be preferred. In general the thin rearmost glass layer will preferably have a thickness of less than 2 mm which thickness is from 16% to 40% the thickness of the thickest glass layer and, when there are at least three thicknesses of glass layer possesses a thickness of from 40 to 80% of the thickness of the next thickest glass layer. The thickest polyvinylbutyral layer will preferably have a thickness equal to at least three times, more preferably at least five times that of the thinnest pvb layer, the thickness of which pvb layer is indeed preferably at least three times that of the next thickest pvb layer.

What is claimed is:

1. A security glass consisting essentially of a plurality of layers of glass of at least three thicknesses, and a plurality of layers of flexible bonding material disposed alternatingly to form a laminate of greater tensile strength than the glass; wherein a layer of the flexible bonding material possesses the greater or greatest thickness of any of the layers of flexible bonding material and is positioned such that it is not the layer of flexible bonding material which is forwardmost in relation to the direction of expected impact, and wherein said laminate includes a rearmost glass layer no more than 2 mm thick which is thinner than the glass layers forward thereof, which possesses a thickness of from 40-80% of the thickness of the next thickest glass layer and which is chemically-toughened so that said laminate substantially resists spalling from the rearmost surface when subject to impact on the frontmost surface.

2. The security glass of claim 1 wherein the flexible bonding material is polyvinylbutyral.

3. The security glass of claim 1 wherein the said thickest layer of flexible bonding material has a thickness equal to at least three times that of the thinnest layer of flexible bonding material.

4. The security glass of claim 3 wherein the said thickest layer of flexible bonding material has a thickness equal to at least three times that of the next thickest layer of flexible bonding material.

5. The security glass of claim 1 wherein the laminate has a symmetrical structure with the said layer of flexible bonding material of greater or grestest thickness being centrally positioned and equal numbers of layers of glass and of flexible bonding material being positioned on either side thereof.

6. The security glass of claim 1 wherein the rearmost glass layer has a thickness of from 16% to 40% of the thickness of the thickest glass layer.

* * * * *